3,206,523
PREPARATION OF SYNTHETIC
LUBRICATING OIL
Donald H. Antonsen, Glen Mills, Pa., assignor to Sun Oil Company, Philadelphia, Pa., a corporation of New Jersey
No Drawing. Filed July 14, 1964, Ser. No. 382,661
18 Claims. (Cl. 260—683.15)

This application is a continuation-in-part of my copending application Serial No. 333,629, filed December 26, 1963, which is a continuation-in-part of my copending application Serial No. 251,724, filed January 16, 1963, the latter in turn being a continuation-in-part of my copending application Serial No. 146,436, filed October 20, 1961, all of said prior applications now being abandoned.

This invention relates to the preparation of snythetic lubricating oils having unusually high viscosity indexes and low pour points by the polymerization of certain straight chain alpha olefins by means of a particular type of catalyst system.

There are various special applications for lubricating oils in which it is highly desirable that the oil employed have an especially high viscosity index, for example, a V.I. above 130. The oil also should have a low pour point, e.g., below —30° F., high oxidation stability and lubricating properties that provide good wear characteristics. One such application is in the lubrication of jet aircraft wherein conditions of both low and high temperature may be encountered. Other special applications in which lubricants having such characteristics are desirable are automatic transmission lubrication, high temperature hydraulic applications and brake fluids. Lubricating oils that can be derived from petroleum generally do not have the combination of properties desired for these special applications.

Lubricating oils having viscosity indexes considerably higher than for those normally derived from petroleum have been prepared heretofore by the polymerization of various olefins. In the prior art several catalyst systems have been disclosed for effecting this reaction to produce oily polymers. Aluminum chloride is one of the catalysts that has been used for this purpose (Montgomery et al. United States Patent No. 2,559,984). This catalyst promotes reaction by a cationic type of mechanism, and accordingly it not only effects polymerization of the olefin but also causes isomerization of both the olefin monomer before polymerization and the polymerization product. This is disadvantageous, since the polymer products obtained in systems where isomerization occurs have lower viscosity indexes than would result in the absence of isomerization.

Garwood United States Patent No. 2,937,129 discloses the use of another type of catalyst system for producing polymeric lubricating oils, namely, ditertiary alkyl peroxides. This type of catalyst promotes reaction by a free radical mechanism and it also has the disadvantage of causing isomerization as well as polymerization to occur.

The polymerization of ethylene to oils by utilizing a combination of $TiCl_4$ and an aluminum alkyl halide such as aluminum ethyl sesquichloride has been described in White et al. United States Patent No. 2,993,942. This type of catalyst system contains both anionic and cationic components, and with higher olefins it also will cause isomerization of the olefin monomer and polymer product to occur. With ethylene as the starting olefin, isomerization of the monomer of course cannot take place but the polymer product has such a high pour point that it generally is not a suitable lubricant for the special types of applications referred to above.

The present invention is directed to the preparation of synthetic lubricating oils by the polymerization of alpha olefins utilizing a catalyst system which minimizes isomerization reactions and provides other benefits over catalyst systems heretofore used. The starting olefin can be any straight chain alpha olefin of the $C_6$–$C_{14}$ range or mixtures thereof. The total oil product boiling above 650° F. that is produced by the reaction generally has a viscosity index above 130 and a pour point substantially below —30° F. Distillate fractions obtained therefrom have outstandingly good low temperature characteristics, exhibiting viscosities at —65° F. which are considerably below values predicted by extrapolation from the viscosities measured at 100° and 210° F. The product, after hydrogenation to saturate double bonds in the polymer, has excellent oxidation stability and provides good wear characteristics in lubricating applications. The polymer product apparently is structurally different from polymers produced by prior art catalyst systems as discussed above, having higher ratios of $CH_2$ to $CH_3$ groups in the molecules and considerably less, if any, quaternary carbon atoms. The invention can be utilized to make products ranging widely in viscosity and having numerous specialty applications.

The invention has particular utility in the manufacture of synthetic oils for use in formulating jet aircraft lubricants such as those conforming to United States Military Specification MIL–L–7808E (March 13, 1963). This specification includes the following property requirements: visc. at 210° F.=3.0 cs. (min.); visc. at 100° F.=11.0 cs. (min.); flash point=400° F. (min.); pour point=—75° F. (max.); and visc. at —65° F. <13,000 cs. The last-mentioned requirement with respect to viscosity at —65° F. is particularly difficult to meet and polyolefin oils generally fail this requirement. Oils can be produced by the present process, however, which meet this low temperature requirement. It is typical of the present products that their actual viscosities at —65° F. are considerably lower than would be expected from their viscosities at 100° and 210° F.

According to the invention, synthetic lubricating oils are prepared by contacting one or more alpha olefins of the $C_6$–$C_{14}$ range at a temperature in the range of 0–50° C. with a catalyst system formed from the following three types of components:

(1) Aluminum alkyl sesquichloride ($AlR_{1.5}Cl_{1.5}$), aluminum dialkyl monochloride ($AlR_2Cl$) or aluminum monoalkyl dichloride ($AlRCl_2$), (2) Titanium tetrachloride, (3) An oxygen-containing organic compound which is either an oxirane or a methyl alkyl ether.

When the oxygen-containing organic compound is an oxirane, it should conform to the formula

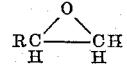

wherein R is either hydrogen or an alkyl group of 1–20 carbon atoms. The oxiranes preferred for use in practicing the invention are ethylene oxide and propylene oxide. However other oxiranes conforming to the foregoing formula can be used, such as the 1,2-epoxy derivatives of butane, n-pentane, isopentane, n-hexane, isohexanes, octanes, decanes, dodecanes, cetane, octadecanes, etc.

When the oxygen-containing component of the catalyst system is a methyl alkyl ether, the alkyl group can be any of those specified above for the oxirane compounds. Examples are dimethyl ether, methyl ethyl ether, methyl propyl ether, methyl isobutyl ether, methyl hexyl ethers, methyl decyl ethers, etc.

The aluminum-containing component of the catalyst system can be either a sesquichloride ($AlR_{1.5}Cl_{1.5}$), an aluminum dialkyl monochloride (AlR$_2$Cl) or an aluminum alkyl dichloride (AlRCl$_2$). The alkyl groups in the aluminum compound can contain from one to ten carbon atoms and perferably are straight chain alkyl groups. The aluminum-containing component can contain branched chain alkyl groups such as isobutyl or isopentyl, although this is not preferred. Examples of suitable alkyl groups are methyl, ethyl, propyl, n-butyl, n-hexyl, n-octyl and n-decyl.

It is highly important for obtaining the best products in good yield that the three components of the catalyst system be present in certain proportions. In the first place the aluminum compound and the titanium tetrachloride should be used in amounts such that the atomic ratio of Al to Ti is in the range of 0.5–2.5, more preferably 1.0–1.6 in the case of sesquichloride, 0.7–1.3 in the case of the monochlorides and 1.0–2.0 in the case of the dichlorides. At Al:Ti ratios below 0.5 the desired viscosity-temperature characteristics of the product cannot be secured, while at ratios above 2.5 the viscosity-temperature characteristics for the oils are poorer and also there is a tendency to produce solid polymers. Secondly, it is highly important that the amount of oxirane or methyl alkyl ether employed in the catalyst system be such that the atomic ratio of O to Al is within a certain narrow range. This range is 0.3:1 to 0.9:1, and the preferred range is 0.4–0.8. At O to Al ratios below 0.3:1 lower yields of product are obtained and poorer viscosity-temperature characteristics of the product are apt to result. An increase of the ratio above 0.9 causes a sharp drop in the yield of product. For preparing jet aircraft lubricants the most preferable O to Al ratios are about 0.5 to 0.67. Increasing the O to Al ratio within the specified range generally increases the average viscosity of the polymer oil produced.

The polymerization reaction can be carried out either with or without a solvent being employed. When no solvent is used, the olefin charge itself functions as the reaction medium and the catalyst is prepared in situ by adding the three above-specified catalyst components to the olefin monomer. In the absence of a solvent there is a tendency for the catalyst to degradate more rapidly and its rate of deterioration depends upon its concentration; hence the olefin to TiCl$_4$ weight ratio preferably should be in excess of 100:1. Alternatively the reaction can be carried out in the presence of a solvent which can be a saturated hydrocarbon or certain types of halohydrocarbons, in which case olefin to TiCl$_4$ ratios below 100:1 can be used if desired without undue degradation of the catalyst occurring. When a saturated hydrocarbon solvent is used, the properties of the polymer oils obtained are substantially the same as when no solvent is employed. On the other hand the use of a halohydrocarbon solvent tends to shift the product molecular weight downwardly and give oils of lower viscosity.

When a saturated hydrocarbon solvent is used, it can be a paraffinic hydrocarbon, including both n-paraffins and isoparaffins, or a naphthenic hydrocarbon or mixtures thereof. Examples of suitable hydrocarbon solvents are n-pentane, isopentane, hexanes, octanes, decanes, cyclohexane, methylcyclopentane, dimethylcyclohexane and the like. An aromatic hydrocarbon, such as benzene or toluene, should not be used since it causes the formation of too much dimer which boils below the lubricating oil range desired. Also with an aromatic hydrocarbon solvent, there is a tendency to obtain alkylation of the aromatic if even small amounts of water happen to be present in the system.

The types of halohydrocarbons that are suitable as the reaction medium are halobenzenes having 1–2 halogen atoms, trihaloethanes, tetrahaloethanes, trihaloethylenes and tetrahaloethylenes, in which halohydrocarbons the halogen can be either chlorine or fluorine or both. Particularly suitable solvents are the monohalobenzenes, viz., chlorobenzene and fluorobenzene, and dihalobenzenes which are liquid at the reaction temperature such as ortho- and meta-dichlorobenzenes of difluorobenzenes, since with such solvents considerably higher yields of polymer lubricating oil per gram of TiCl$_4$ used are often obtainable than when a saturated hydrocarbon reaction medium is employed. Examples of other halohydrocarbons that can be used are: methyl chloroform; 1,1,2-trichloroethane; 1,1,2,2-tetrachloroethane; trifluoroethanes; chlorodifluoroethanes; tetrafluoroethane; and similar ethylene derivatives containing 3–4 halogen atoms which are chlorine and/or fluorine. In using a solvent the weight ratio thereof to olefin monomer generally is in the range of 1:2 to 4:1.

The weight proportion of olefin charge to titanium tetrachloride used in the reaction mixture can vary widely, ranging for example from 25:1 to 1000:1 depending upon the purity of the olefin charge, the absence or presence of a solvent, the type of solvent used and which aluminum alkyl compound is employed. When highly purified olefin monomer is used and the aluminum compound is a sesquichloride, 75–85% of the olefin typically can be converted to higher boiling products at olefin to TiCl$_4$ ratios up to 500:1 either in the presence or absence of a solvent. On the other hand, when diethyl aluminum chloride is used with a highly purified monomer charge, the presence or absence of and the type of solvent employed have an influence on the product yield obtained. Thus with no solvent or with a saturated hydrocarbon solvent conversions typically are about 50% at a 300:1 olefin to TiCl$_4$ ratio and 75% at a 100:1 ratio, while for chlorohydrocarbon solvents typical conversions in using diethyl aluminum chloride are 80% at ratios of 300:1 or less and 55% at a 500:1 ratio. Ethyl aluminum dichloride performs more or less like the sesquichloride either in the presence or absence of a solvent except that its activity is somewhat lower and consequently slightly lower conversions are obtained.

The temperature for carrying out the reaction is in the range of 0–50° C. With a saturated hydrocarbon solvent a temperature of 10–30° C. preferably is used, while with a halohydrocarbon solvent the preferred temperature is 25–40° C. The molecular weight of the product tends to increase with increasing reaction temperature. At temperatures below 0° C. substantially no reaction is obtained, while at temperatures above 50° C. the viscosity of the product becomes extremely high and also the catalyst becomes considerably less active.

After the polymerization reaction has been completed, the catalyst can be deactivated and its residues removed in any conventional or suitable manner and the reaction mixture can be fractionated to recover the reaction medium and unreacted monomer. The polymer product can then be distilled to separate synthetic oils of boiling ranges as desired. The synthetic oils obtained preferably are hydrogenated in known manner prior to use in lubricating applications. Typical conditions for liquid phase hydrogenation using a Raney nickel catalyst comprise temperatures in the range of 150–250° C. and a hydrogen pressure in the range of 1000–2500 p.s.i.g. The resulting hydrogenated products have outstanding oxidation stabilities and lubricating characteristics.

For the purpose of illustrating how polymer oils produced according to the present invention are superior to oils obtained by using other catalyst systems, two runs were made in which octene-1 and decene-1 were polymerized by the present method. Comparative runs were also made in which octene-1 was polymerized by means of aluminum chloride in the manner disclosed in Montgomery et al. United States Patent No. 2,559,984 and decene-1 was polymerized using ditertiary butyl peroxide as catalyst as disclosed in Garwood United States Patent No. 2,937,129. These runs and the results are described in examples which follow:

EXAMPLE A

In a stirred reactor that had been carefully dried a catalyst system was prepared by adding to 190 ml. of dried n-hexane 10.4 ml. of a 3.18 molar hexane solution of aluminum ethyl sesquichloride, 2.91 ml. (5.03 g.) of TiCl$_4$ and 22 ml. of a 1.0 molar hexane solution of propylene oxide. The components of the catalyst system were added to the reactor in the order mentioned. The Al:Ti ratio in the mixture was 1.25 and the O:Al ratio was 0.67. Octene-1 was then introduced therein in amount of 260.9 g. and the mixture was stirred at 15° C. for 23 hours. The catalyst was then deactivated by adding to the reaction mixture 20 g. of Na$_2$CO$_3$, adding 25 ml. of water with thorough mixing and then filtering. The filtrate was topped to remove unreacted octene. The polymer was separated into the following fractions by vacuum distillation at a pressure of about 1 mm. Hg absolute:

|  | Boiling range at atmos. pressure, ° F. |
|---|---|
| Dimer | <650 |
| Trimer | 650–715 |
| Tetramer | 715–850 |
| Pentamer | 850–1000 |
| Residue | 1000+ |

The amount of dimer obtained was 29.4 g. and the amount of total oils boiling thereabove was 187.5 g. This corresponds to about an 83% total conversion of the octene, and the yield of oil boiling above 650° F. expressed as a weight ratio to the TiCl$_4$ used was about 37:1. Various tests were made on these fractions and also on samples of the total polymer and the total oil boiling above the trimer. Results are given in Table A.

*Table A*

|  | Total polymer | Total oil above 650° F. | Trimer | Tetramer | Pentamer | Residue |
|---|---|---|---|---|---|---|
| KV at 100° F., cs | 22.26 | 113.1 | 7.84 | 17.27 | 41.14 | 1200 |
| KV at 210° F., cs | 5.73 | 18.20 | 2.27 | 3.82 | 7.01 | 113 |
| Viscosity index | 180 | 142 | 112 | 130 | 134 | 125 |
| Pour point, ° F | <−90 | −75 | <−90 | <−90 | <−90 | −40 |
| CH$_2$:CH$_3$ ratio | 4.12 | 4.20 | 4.14 | 4.16 | 4.18 | 4.41 |
| Molecular weight | 602 | 670 | 365 | 488 | 625 | 1539 |
| Refractive index, $n_D^{20}$ | 1.4580 | 1.4625 | 1.4543 | 1.4591 | 1.4631 | 1.4696 |
| Density, $d_4^{20}$ | 0.8201 | 0.8290 | 0.8073 | 0.8188 | 0.8284 | 0.8469 |
| Bromine No | 21.3 | 19.7 | 29.4 | 22.5 | 18.8 | 11.6 |

From the data given in Table A it can be seen that synthetic oil of high V.I. and low pour point was produced. The total oil boiling above 650° F. had a V.I. of 142, which is higher than that for any of the fractions obtained therefrom. This is due to a blending effect that is often exhibited by mixtures of relatively low and high boiling oils and which results in an anomalously high V.I. for the blend.

COMPARISON EXAMPLE A′

For comparison with the results of the preceding example a run was made in which octene-1 was polymerized in a reactor at a temperature of 35–40° C. using 2% by weight of a granular aluminum chloride as the catalyst. A reaction time of 30 minutes was used and the conversion of the octene to polymers was about 16%. After quenching the product with ice water, it was topped to remove unreacted octene and an attempt was made to vacuum distill the polymer at a pressure of 1 mm. Hg absolute to obtain the same fractions as in the preceding example. In this case, however, it was found that the distillate boiling above the tetramer fraction could not be obtained due to decomposition. Results of tests on the two distillate fractions obtained and on samples of the total polymer and total oil boiling above 650° F. are shown in Table A′.

*Table A′*

|  | Total polymer | Total oil above 650° F. | Trimer | Tetramer | Residue |
|---|---|---|---|---|---|
| KV at 100° F., cs | 130.1 | 267.0 | 9.11 | 23.71 | 647.0 |
| KV at 210° F., cs | 17.45 | 27.0 | 2.37 | 4.62 | 42.6 |
| Viscosity index | 132 | 123 | 81 | 126 | 110 |
| Pour point, ° F | −60 | −48 | −65 | −55 | −25 |
| CH$_2$:CH$_3$ ratio | 3.9 | 4.0 | 3.1 | 3.6 | 3.5 |
| Molecular weight | 695 | 750 | 330 | 441 | 950 |
| Refractive index, $n_D^{20}$ | 1.4672 | 1.4702 | 1.4583 | 1.4639 | 1.4782 |
| Density, $d_4^{20}$ | 0.8361 | 0.8476 | 0.8100 | 0.8230 | 0.8591 |
| Bromine No | 22.6 | 21.3 | 44.5 | 37.6 | 16.0 |

A comparison of these data with the results given in Table A shows that the oils obtained by using AlCl$_3$ as catalyst have distinctly lower viscosity indexes and higher pour points than oils of comparable boiling ranges made by the present invention. Furthermore the AlCl$_3$ oils have lower CH$_2$:CH$_3$ ratios, which indicates that more isomerization occurred during the reaction. Other differences are shown by the refractive index and density values, which are higher for the AlCl$_3$ oils than for oils of comparable boiling ranges made by the present process. All of these factors clearly indicate that the oils made according to the present invention are substantially different structurally from those prepared by means of AlCl$_3$. A still further indication of structural difference resides in the fact that the polymers made by the present process are more thermally stable than the AlCl$_3$ type of polymers, as shown by the fact that the latter cannot be vacuum distilled at 1 mm. Hg absolute through the pentamer fraction without decomposition. This is interpreted as indicating the presence of quaternary carbon atoms in the AlCl$_3$-promoted oils, i.e., carbon atoms each attached to four other carbon atoms, which can result from the isomerization reactions effected by the AlCl$_3$. This type of hydrocarbon structure is known to be less thermally stable than structures not containing quaternary carbon atoms. Since in the catalyst system used in the present invention cationic effects have been suppressed by the presence of the oxirane or methyl alkyl ether component, such isomerization is likewise suppressed and there are either much less or no quaternary carbons in the polymer product.

The differences in properties of the oils made according to Examples A and A′ are critical with respect to the manufacture of aircraft oils conforming to Specification MIL-L-7808E referred to above. Oils in Example A are suitable for this purpose but the oils produced by means of $AlCl_3$ do not have the low temperature characteristics necessary for meeting the specifications.

EXAMPLE B

Another run was made in which decene-1 was polymerized by means of the present catalyst. The catalyst system was prepared by adding to 160 ml. of n-hexane 8.3 ml. of a 3.18 molar hexane solution of aluminum ethyl sesquichloride, 17.6 ml. of a 1.2 molar hexane solution of $TiCl_4$ and 17.7 ml. of a 1.0 molar hexane solution of propylene oxide. The Al:Ti ratio and the O:Al ratio in the mixture were 1.25 and 0.67 respectively. Decene-1 in amount of 100 g. was added to the mixture and was reacted for 21 hours at 20° C. The product was worked up as in Example A and vacuum distilled to obtain the following fractions:

|  | Boiling range at atmos. pressure, °F. |
|---|---|
| Dimer | <650 |
| Trimer | 650–850 |
| Tetramer | 850–1000 |
| Residue | 1000+ |

There were obtained 14.6 g. of dimer and 62.7 g. of higher boiling oils. Test results are given in Table B.

*Table B*

|  | Total oil above 650° F. | Trimer | Tetramer | Residue |
|---|---|---|---|---|
| KV at 100° F., cs | 129.4 | 13.7 | 28.63 | 418.7 |
| KV at 210° F., cs | 30.7 | 3.41 | 5.60 | 50.1 |
| Viscosity index | 141 | 143 | 143 | 130 |
| Pour point, °F | −45 | −48 | −42 | −15 |
| $CH_2$:$CH_3$ ratio | 5.3 | 4.8 | 5.4 | 5.4 |
| Molecular weight | 700 | 455 | 610 | 1251 |
| Refractive index, $n_D^{20}$ | 1.4650 | 1.4582 | 1.4619 | 1.4691 |
| Density, $d_4^{20}$ | 0.8275 | 0.8159 | 0.8263 | 0.8421 |
| Bromine No | 17.2 | 23.0 | 18.8 | 10.6 |

These data show that oils having viscosity indexes above 140 and pour points below −40° F. can be produced from decene-1 by the present catalyst system.

COMPARISON EXAMPLE B′

A run for comparative purposes was made by polymerizing decene-1 using ditertiary butyl peroxide as catalyst. 303 g. of decene-1 was charged to a reactor and heated to 150–160° C., and 20 g. of the peroxide was added slowly over a period of one hour. The mixture was then heated under refluxing conditions for another hour. Thereafter the addition of peroxide followed by refluxing was repeated in the same manner three times. The product was topped to remove unreacted decene and then was vacuum distilled at 1 mm. Hg. absolute in an attempt to obtain fractions of the same boiling ranges as in Example B. In this case the tetramer fraction could not be obtained due to decomposition, indicating that this product, like the $AlCl_3$ oils, contained thermally unstable components probably due to hydrocarbon structures including quaternary carbon atoms. Results for the products obtained are shown in Table B′.

*Table B′*

|  | Total oil above 650° F. | Trimer | Residue |
|---|---|---|---|
| KV at 100° F., cs | 139.5 | 15.76 | 181.4 |
| KV at 210° F., cs | 17.44 | 3.60 | 20.78 |
| Viscosity index | 128 | 128 | 125 |
| Pour point, °F | −55 | −50 | −36 |
| $CH_2$:$CH_3$ ratio | 4.78 | 4.4 | 5.4 |
| Molecular weight | 695 | 444 | 1080 |
| Refractive index, $n_D^{20}$ | 1.4702 | 1.4609 | 1.4719 |
| Density, $d_4^{20}$ | 0.8439 | 0.8261 | 0.8486 |
| Bromine No | 21.8 | 36.1 | 14.0 |

A comparison of this table with Table B shows that the oils produced by means of the peroxide catalyst have distinctly lower viscosity indexes than those made by the catalyst system used in the present invention. Differences in structure are evidenced by the lower $CH_2$:$CH_3$ ratios, higher refractive indexes and higher densities for the peroxide-promoted products.

In addition to the distinctions pointed out above with respect to properties of the polymer oils prepared according to the present invention and those prepared by prior art procedures, the existence of definite structural distinctions have also been shown from molecular volume calculations. Thus molecular volume calculations have shown that the polyoctene oils produced in Example A are structurally distinct from those produced by the prior art procedure described in Example A′. The same is true of the polydecene oils produced, respectively, in Examples B and B′.

EXAMPLE C

The present example provides a comparison between the results obtained under the conditions described in Example A with results of a run made without using any propylene oxide in the catalyst but otherwise under identical conditions. Table C shows the comparative data.

From the data it can be seen that one effect of the use of propylene oxide in the catalyst system is to increase

*Table C*

|  | Total oil above 650° F. | Trimer | Tetramer | Pentamer | Residue |
|---|---|---|---|---|---|
| With propylene oxide: |  |  |  |  |  |
| KV at 210° F., cs | 18.20 | 2.27 | 3.82 | 7.01 | 113 |
| Viscosity index | 142 | 112 | 130 | 134 | 125 |
| Without propylene oxide: |  |  |  |  |  |
| KV at 210° F., cs | 6.61 | 2.41 | 4.11 | 7.03 | 37.13 |
| Viscosity index | 143 | 100 | 117 | 128 | 125 | the molecular weight of the product, as evidenced by the higher viscosities for the total oil and the residue when propylene oxide was used. The other effect shown is that the distillate oils have distinctly higher viscosity indexes than when the propylene oxide is omitted. The viscosity index values for the total oils and residues are about the same in each case, but this is misleading because of the much different viscosities obtained for these products with and without propylene oxide. The viscosity index for polymeric oils of the kind here concerned decreases as the viscosity or molecular weight increases, and a valid comparison of the true viscosity-temperature characteristics of the products can be made only if the oils are of relatively narrow boiling range and about the same molecular weight levels. The fact that the total oil and residue products obtained with propylene oxide have about the same viscosity indexes as obtained without it indicates that the propylene oxide-produced materials actually have better viscosity-temperature characteristics in view of their higher viscosity levels.

EXAMPLE D

In the foregoing examples illustrating the polymerization reaction in accordance with the invention, a saturated hydrocarbon reaction medium (viz., hexane) was used. The present example illustrates the use of a chlorohydrocarbon as the liquid reaction medium. Octene-1 was polymerized at 30° C. in chlorobenzene for a time of 20 hours, the procedure being generally analogous to that described in Example A. The catalyst system was formed from propylene oxide, aluminum ethyl sesquichloride and $TiCl_4$. The Al:Ti atomic ratio was 1.25 and the O:Al ratio was 0.67. The weight ratio of octene-1 to $TiCl_4$ employed in this case was 300:1. Results were as follows:

Percent conversion of octene-1 to polymers ____ 72.9
Total oil boiling above 650° F.:
    Percent of total polymers _____ 68.4
    K.V. at 100° F. _____ 73.9
    K.V. at 210° F. _____ 12.6
    Viscosity index _____ 143.5
    Pour point, ° F. _____ <−70
    $CH_2$:$CH_3$ ratio _____ 4.2

The foregoing data show that the total oil of boiling range above 650° F. closely resembled that produced in Example A in which the saturated hydrocarbon reaction medium was used. However, whereas the yield of oil above 650° F. expressed as a weight ratio to the $TiCl_4$ was about 37:1 in Example A, the corresponding yield in the present run was about 149:1.

EXAMPLE E

A series of runs was made in which octene-1 was polymerized in the absence of a solvent and propylene oxide was used in varying concentrations in the catalyst. In each run aluminum ethyl sesquichloride and $TiCl_4$ were used in constant amounts such that the Al:Ti ratio was 1.25, and the weight ratio of octene-1 to $TiCl_4$ was 300:1. Each run was carried out at 30° C. for 20 hours. Results are shown in Table E.

Table E

| O:Al ratio | Percent conversion of octene-1 | Percent dimer obtained | Total oil above 650° F. | |
|---|---|---|---|---|
| | | | KV at 210° F., cs | V.I. |
| 0.00 | 57.7 | 14.7 | 7.9 | 140 |
| 0.50 | 77.4 | 12.4 | 22.6 | 139 |
| 0.67 | 82.9 | 13.7 | 25.1 | 136 |
| 0.75 | 82.6 | 13.9 | 37.4 | 134 |
| 1.00 | 19.5 | 12.1 | 104.0 | 136 |

The values listed for percent conversion show that at the catalyst concentration here employed there is a distinct increase in yield as propylene oxide is incorporated in the catalyst, that a maximum yield is obtained at an O:Al ratio in the neighborhood of 0.7 and that thereafter the yield drops off sharply as this ratio exceeds 0.9. The data also show that the viscosity of the product oil increases as the O:Al ratio increases.

When an aluminum dialkyl monochloride is substituted for the sesquichloride of Example E, an analogous increase in conversion followed by decrease thereof is obtained as the proportion of propylene oxide is increased, but the maximum conversion is obtained at a somewhat lower O:Al ratio.

EXAMPLE F

Three runs were made in which diethyl aluminum chloride in combination with $TiCl_4$ was used in preparing the catalyst. The Al:Ti ratio in each run was 1.25. In two of the runs the catalyst included propylene oxide, while in the other no oxygen-containing component was added. The reaction time was 20 hours at 30° C. Other conditions are given in Table F along with the results obtained.

Table F

| O:Al ratio | Solvent | Octene-1:$TiCl_4$ ratio | Percent conversion octene-1 | Percent dimer obtained | Total oil above 650° F. | |
|---|---|---|---|---|---|---|
| | | | | | KV at 210° C., cs | V.I. |
| 0.00 | n-Hexane | 300:1 | 40.9 | 21.2 | 33.9 | 136 |
| 0.50 | None | 500:1 | 83.6 | 11.0 | 46.4 | 131 |
| 0.50 | Chlorobenzene | 500:1 | 80.2 | 13.9 | 39.1 | 134 |

The data show that in the run in which no propylene oxide was included in the catalyst the yield of total polymer formed was poor and the proportion thereof constituting the dimer fraction was relatively high. On the other hand data for the other two runs show that good results can be obtained, with or without a solvent, using a monochloride as the aluminum-containing component of the catalyst along with propylene oxide.

EXAMPLE G

A number of typical distillate oils were obtained from products formed by polymerizing octene-1 in n-hexane using the $TiCl_4$-aluminum ethyl sesquichloride-propylene oxide catalyst (Al:Ti=1.25; O:Al=0.67). Kinematic viscosities of these oils were measured at −65° F. in addition to the standard temperatures of 100° and 210° F. Table G gives a comparison between the −65° F. viscosities as measured and as determined by extrapolating from the 100° and 210° viscosities.

Table G

| CS at 100° F. | CS at 210° F. | KV at −65° F., cs. | |
|---|---|---|---|
| | | Measured | Extrapolated |
| 7.91 | 2.28 | 1,743 | 5,000 |
| 11.05 | 2.85 | 3,691 | 12,000 |
| 18.78 | 4.00 | 12,211 | 50,000 |
| 22.69 | 4.54 | 19,884 | 80,000 |
| 28.93 | 5.36 | 32,607 | 130,000 |
| 41.75 | 6.92 | 80,054 | 250,000 |

The foregoing comparison shows that the actual viscosities at −65° F. for the present products are much lower than would be expected from a projection of the viscosity-temperature curves based on the 100° and 210° viscosities. This indicates that the present oils are more suitable for use in low temperature applications than hydrocarbon polymer oils heretofore prepared.

Hydrogenated polymer oils prepared according to the present invention not only have outstanding viscosity-temperature properties but they also have excellent oxidation stability and good lubricating characteristics. These desirable properties are illustrated by the data presented in the following examples.

EXAMPLE H

A distillate fraction of polyoctene oil prepared under essentially the same reaction conditions as described in Example A was hydrogenated in a bomb using a Raney nickel catalyst at 150° C. and an initial hydrogen pressure of about 2000 p.s.i.g. 0.5% of an oxidation inhibitor (phenyl-α-naphthalamine) was added to the hydrogenated oil and the inhibited oil was subjected to a modified Underwood oxidation test at a temperature of 325° F. for 16 hours. The inhibited oil initially had a kinematic viscosity at 100° F. of 91.9 cs. The procedure involved circulating the oil from a batch and spurting it continuously against copper-lead and nickel-cadmium bearings in contact with air. For comparison a commercial automatic transmission fluid (ATF), prepared from a solvent extracted petroleum lubricating oil by blending in a mixture of inhibitors, was subjected to the same test. The comparative results are shown in Table H.

*Table H*

|  | Inhibited hydrogenated polyoctene | Commercial ATF |
| --- | --- | --- |
| Bearing weight loss, mg./sq. cm.: |  |  |
| Copper-lead | 0.029 | 11.9 |
| Nickel-cadmium | 0.404 | 52.9 |
| Oxidized oil: |  |  |
| Viscosity increase, percent | 11.3 | 38.5 |
| Acid No., mg. KOH/g | 0.11 | 14.8 |
| Pentane insolubles, percent | 0.02 | 11.8 |
| Benzene insolubles, percent | 0.01 | 0.04 |
| Insoluble resins | 0.01 | 11.76 |
| Soluble resins | 0.52 | 3.97 |

These results show that the inhibited hydrogenated polyoctene oil was much more stable toward oxidation than the commercial automatic transmission fluid.

EXAMPLE J

Another batch of hydrogenated polyoctene oil prepared under reaction conditions similar to those set forth in Example A was subjected to another oxidation test without having any inhibitor added. The test was carried out in a test tube containing a body of the oil which was maintained at 325° F. and which had dissolved therein iron naphthenate in amount of 0.01% by weight, calculated at $Fe_2O_3$, to promote oxidation. A small air inlet tube extending downwardly into the oil was connected with an open ended side tube which projected upwardly above the oil and terminated adjacent a steel tube specimen and a copper strip each of which was partly immersed in the oil. The air inlet tube contained an opening just beneath the side tube through which oil was continuously drawn by the stream of air flowing into the side tube. The effect of feeding air into the system was to spray a continuous stream of air and oil against the steel and copper specimens. The test was run for a period of 24 hours. For comparison a duplicate test was also carried out on the inhibitor-containing automatic transmission fluid used in Example H. Results are shown in Table J.

*Table J*

|  | Uninhibited hydrogenated polyoctene | Commercial ATF |
| --- | --- | --- |
| Steel appearance | Bright | Slight tarnish |
| Copper loss, mg./sq. cm | Nil | 0.2 |
| Viscosity increase, percent | 0.7 | 16 |
| Pentane insolubles, percent | 0.03 | 0.21 |
| Insoluble resins, percent | 0.03 | 0.20 |
| Soluble resins, percent | 4.23 | 7.24 |
| Acid No., mg. KOH/g | 1.22 | 1.19 |

These results show that the uninhibited oil of the present invention was even more stable toward oxidation than the commercial ATF which contained inhibitors.

EXAMPLE K

The lubricating characteristics of the uninhibited hydrogenated polyoctene oil of Example H and of a commercial uninhibited solvent extracted petroleum oil were determined by testing fresh samples of the oils in the so-call Four Ball Wear Machine described in an article appearing in Lubrication Engineering, vol. 1, p. 35, (1945). In this test the diameter of a scar formed on the metal is taken as a measure of the lubricating properties of the oil. The tests were run at 600 r.p.m., 75° C. and 10 kg. load for 2 hours. The results were as follows:

Diameter of wear scar, mm.
Hydrogenated polyoctene oil _____ 0.46
Solvent extracted oil _____ 0.64

These results show that oil produced by the present invention has somewhat better lubricating characteristics than conventional solvent extracted oil.

EXAMPLE L

Comparative runs were made in polymerizing octene-1 utilizing in one case propylene oxide and in the other, 1,2-epoxy dodecane as the oxygen-containing component of the catalyst system. The catalysts were made in the manner described in Example A, and in each case the Al:Ti ratio was 1.25 and the O:Al ratio was 0.67. The time of reaction was twenty hours. Results for these runs are shown in Table L.

*Table L*

|  | G. of dimer/ g. of $TiCl_4$ | G. of oil above 650° F./ g. of $TiCl_4$ | Percent conversion of octene | Total 650+° F. oil | |
| --- | --- | --- | --- | --- | --- |
|  |  |  |  | KV at 210° F., cs | V.I. |
| Propylene oxide | 5.8 | 31.5 | 72 | 21.0 | 141 |
| 1,2-epoxy dodecane | 8.6 | 23.4 | 62 | 13.7 | 143 |

From these data it can be calculated that the reactivity (based on total polymer produced) obtained with 1,2-epoxy dodecane is about 86% of that obtained with propylene oxide. Also the use of 1,2-epoxy dodecane results in oil having a substantially lower viscosity level.

EXAMPLE M

Two comparative runs were made in which ethyl aluminum dichloride was used in combination with $TiCl_4$. In one run no oxygen-containing component was included while in the other run propylene oxide was incorporated in the catalyst in amount such that the O:Al ratio was 0.63. In each run no solvent was employed and the weight ratio of octene-1 to $TiCl_4$ was 300:1. The reaction time for each run was 20 hours and the temperature was 30° C. Results are listed in Table M.

*Table M*

| O:Al ratio | Percent conversion of octene-1 | Percent dimer obtained | Total oil above 650° F. | |
| --- | --- | --- | --- | --- |
|  |  |  | KV at 210° F., cs | V.I. |
| 0.00 | 64.0 | 16.4 | 6.8 | 134 |
| 0.63 | 70.8 | 15.1 | 7.5 | 139 |

These results show that the incorporation of propylene oxide in the catalyst system caused a substantial increase in the conversion of octene-1 and also resulted in substantially better viscosity-temperature properties for the lubricating oil product.

When other oxiranes or methyl alkyl ethers as herein specified are used in place of propylene oxide, results substantially similar to those shown in the foregoing examples are obtained.

I claim:

1. Method of preparing a synthetic lubricating oil which comprises contacting straight chain alpha olefin of the $C_6$–$C_{14}$ range at a temperature in the range of 0–50° C. with a catalyst system formed from (1) an aluminum compound selected from the group consisting of aluminum alkyl sesquichlorides, aluminum dialkyl monochlorides and aluminum monoalkyl dichlorides, (2) titanium tetrachloride and (3) an oxygen-containing organic compound selected from the group consisting of oxiranes having the formula

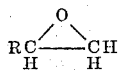

wherein R is selected from the group consisting of hydrogen and alkyl groups having 1–20 carbon atoms and methyl alkyl ethers in which the alkyl group has 1–20 carbon atoms, the amounts of said aluminum compound and titanium tetrachloride being such that the atomic ratio of Al to Ti is in the range of 0.5–2.5 and the amount of said oxygen-containing organic compound being such that the atomic ratio of O to Al is in the range of 0.3–0.9, and thereafter separating from the reaction mixture olefin polymer of lubricating oil boiling range.

2. Method according to claim 1 wherein the aluminum compound is an aluminum alkyl sesquichloride and the ratio of O to Al is in the range of 0.4–0.8.

3. Method according to claim 2 wherein the Al to Ti ratio is in the range of 1.0–1.6.

4. Method according to claim 3, wherein said organic compound is propylene oxide.

5. Method according to claim 3 wherein said organic compound is ethylene oxide.

6. Method according to claim 1 wherein the aluminum compound is an aluminum dialkyl monochloride and the ratio of O to Al is in the range of 0.4–0.8.

7. Method according to claim 6 wherein the Al to Ti ratio is in the range of 0.7–1.3.

8. Method according to claim 7 wherein said organic compound is propylene oxide.

9. Method according to claim 7 wherein said organic compound is ethylene oxide.

10. Method according to claim 1 wherein the aluminum compound is an aluminum monoalkyl dichloride and the ratio of O to Al is in the range of 0.4–0.8.

11. Method according to claim 10 wherein the Al to Ti ratio is in the range of 1.0–2.0.

12. Method according to claim 11 wherein said organic compond is propylene oxide.

13. Method according to claim 11 wherein said organic compound is ethylene oxide.

14. Method according to claim 1 wherein said organic compound is propylene oxide.

15. Method according to claim 1 wherein said organic compound is ethylene oxide.

16. Method according to claim 1 wherein said temperature is in the range of 10–40° C.

17. Method of preparing a synthetic lubricating oil which comprises contacting straight chain alpha olefin of the $C_6$–$C_{14}$ range at a temperature in the range of 10–40° C. with a catalyst system formed from an aluminum alkyl sesquichloride, titanium tetrachloride and propylene oxide, the amounts of the aluminum alkyl sesquichloride and titanium tetrachloride being such that the atomic ratio of Al to Ti is in the range of 1.0–1.6 and the amount of propylene oxide being such that the atomic ratio of O to Al is in the range of 0.4–0.8, and thereafter separating from the reaction mixture olefin polymer of lubricating oil boiling range.

18. Method of preparing a synthetic lubricating oil which comprises contacting straight chain alpha olefin of the $C_6$–$C_{14}$ range at a temperature in the range of 10–40° C. with a catalyst system formed from an aluminum dialkyl monochloride, titanium tetrachloride and propylene oxide, the amounts of the aluminum dialkyl monochloride and titanium tetrachloride being such that the atomic ratio of Al to Ti is in the range of 0.7–1.3 and the amount of propylene oxide being such that the atomic ratio of O to Al is in the range of 0.4–0.8, and thereafter separating from the reaction mixture olefin polymer of lubricating oil boiling range.

References Cited by the Examiner

UNITED STATES PATENTS

| | | | |
|---|---|---|---|
| 2,965,691 | 12/60 | Voltz | 260—683.15 |
| 3,108,145 | 10/63 | Antonsen | 260—683.115 |
| 3,116,274 | 12/63 | Boehm et al. | 260—93.7 |

FOREIGN PATENTS 1,263,806  5/61  France.

ALPHONSO D. SULLIVAN, *Primary Examiner.*